(12) United States Patent
Fischer

(10) Patent No.: US 10,676,934 B2
(45) Date of Patent: Jun. 9, 2020

(54) BRACKET COVER FLASHING SYSTEM AND METHOD OF USE

(71) Applicant: Todd Fischer, Redding, CA (US)

(72) Inventor: Todd Fischer, Redding, CA (US)

(*) Notice: Subject to any disclaimer, the term of this patent is extended or adjusted under 35 U.S.C. 154(b) by 0 days.

(21) Appl. No.: 15/811,266

(22) Filed: Nov. 13, 2017

(65) Prior Publication Data

US 2018/0340336 A1 Nov. 29, 2018

Related U.S. Application Data

(60) Provisional application No. 62/510,909, filed on May 25, 2017.

(51) Int. Cl.
| | |
|---|---|
| *E04D 13/14* | (2006.01) |
| *E04D 13/147* | (2006.01) |
| *E04D 5/14* | (2006.01) |
| *E04B 1/38* | (2006.01) |
| *E04B 1/41* | (2006.01) |
| *E04F 10/00* | (2006.01) |

(52) U.S. Cl.
CPC ........... *E04D 13/14* (2013.01); *E04D 5/142* (2013.01); *E04D 13/147* (2013.01); *B32B 2419/06* (2013.01); *E04B 1/40* (2013.01); *E04B 2001/405* (2013.01); *E04F 10/005* (2013.01)

(58) Field of Classification Search
CPC ... E04D 13/14; E04D 13/1415; E04D 13/155; E04D 13/0305; E04D 13/031; E04D 13/0315; E04D 13/032; E04D 13/1407; E04D 13/15; E04D 5/142; E04D 5/146; E04F 10/005; E04F 10/08; E04B 1/40; E04B 2001/405; B32B 2419/06
USPC ........................................... 52/58, 60, 94, 97
See application file for complete search history.

(56) References Cited

U.S. PATENT DOCUMENTS

| | | | | |
|---|---|---|---|---|
| 720,811 | A * | 2/1903 | Ingram | E04D 13/1415 52/58 |
| 2,648,105 | A * | 8/1953 | Kurtz | E04F 10/08 52/75 |
| 2,776,460 | A * | 1/1957 | Bottom | E04F 10/08 16/264 |
| 2,797,451 | A * | 7/1957 | Brown | E04F 10/08 52/473 |
| 2,807,061 | A * | 9/1957 | Stone | E04F 10/005 52/74 |
| 2,895,185 | A * | 7/1959 | Preaus | E04F 10/08 52/465 |
| 2,990,590 | A * | 7/1961 | Graveley | E04F 10/08 403/189 |

(Continued)

*Primary Examiner* — Ryan D Kwiecinski
*Assistant Examiner* — Matthew J Gitlin
(74) *Attorney, Agent, or Firm* — Shannon Warren

(57) ABSTRACT

A bracket-flashing assembly for roofing in a bracket. Said bracket-flashing assembly comprise said bracket, a bracket cover and a fasteners. Said bracket comprise a fastener apertures configured to receive a portion of said fasteners to selectively attach said bracket-flashing assembly to a fixed structure and an added fixture. Said bracket comprise a first portion and a second portion. Said first portion is attached to said second portion at an elbow. Said bracket cover comprises a raised portion and a body. Said raised portion comprises a stamped portion of said raised portion being shaped to selectively encase a portion of said second portion.

9 Claims, 17 Drawing Sheets

(56) References Cited

U.S. PATENT DOCUMENTS

| | | | | |
|---|---|---|---|---|
| 2,996,843 A * | 8/1961 | Mack | ................ | E04D 13/1475 |
| | | | | 156/71 |
| 3,388,510 A * | 6/1968 | Smith | .................... | E04F 10/08 |
| | | | | 52/15 |
| RE27,502 E * | 10/1972 | Martin | .................... | E04D 1/265 |
| | | | | 52/461 |
| 3,698,142 A * | 10/1972 | Theriault | ............ | E04D 13/1475 |
| | | | | 52/556 |
| 4,468,899 A * | 9/1984 | Miller | ................... | E04D 13/031 |
| | | | | 52/200 |
| 4,625,469 A * | 12/1986 | Gentry | ................. | E04D 3/3601 |
| | | | | 52/3 |
| 4,932,171 A * | 6/1990 | Beattie | ............... | E04D 13/1415 |
| | | | | 52/273 |
| 5,027,576 A * | 7/1991 | Gustavsson | ......... | E04D 13/1475 |
| | | | | 52/200 |
| 5,072,552 A * | 12/1991 | Sauder | ............... | E04D 13/1407 |
| | | | | 52/219 |
| 5,309,685 A * | 5/1994 | Rathgeber | ............. | E04D 5/142 |
| | | | | 428/189 |
| 5,381,632 A * | 1/1995 | Damron | ............. | E04D 13/1475 |
| | | | | 52/200 |
| 5,746,027 A * | 5/1998 | Bonerb | ............. | E04D 13/0762 |
| | | | | 52/1 |
| 5,806,255 A * | 9/1998 | Verby | ................ | E04D 13/0315 |
| | | | | 52/200 |
| 6,003,276 A * | 12/1999 | Hegemier | ................. | E04H 9/02 |
| | | | | 156/71 |
| 6,088,992 A * | 7/2000 | Nunley | .................... | E04D 3/40 |
| | | | | 52/716.2 |
| 6,681,530 B1 * | 1/2004 | Givens | ............... | E04D 13/1407 |
| | | | | 108/16 |
| 7,921,607 B2 * | 4/2011 | Thompson | .............. | F24S 25/61 |
| | | | | 52/60 |
| 8,136,319 B2 * | 3/2012 | Kelly | ..................... | E04D 11/02 |
| | | | | 52/408 |
| 8,567,143 B2 * | 10/2013 | Kalwara | ........... | E04D 13/1407 |
| | | | | 52/309.1 |
| 8,631,611 B2 * | 1/2014 | Kalwara | ............. | E04D 13/1407 |
| | | | | 428/40.1 |
| 8,713,858 B1 * | 5/2014 | Xie | ....................... | E04D 13/147 |
| | | | | 52/58 |
| 2003/0046878 A1 * | 3/2003 | Zdeb | ........................ | E04D 3/40 |
| | | | | 52/58 |
| 2005/0183345 A1 * | 8/2005 | Allen | .................. | E04D 13/1478 |
| | | | | 52/58 |
| 2006/0053699 A1 * | 3/2006 | Lolley | .................... | E02D 31/02 |
| | | | | 52/58 |
| 2006/0156648 A1 * | 7/2006 | Thompson | .............. | F24S 25/61 |
| | | | | 52/173.3 |
| 2006/0174552 A1 * | 8/2006 | Nocito | .................... | E04D 13/10 |
| | | | | 52/95 |
| 2006/0265970 A1 * | 11/2006 | Hoffman | ................... | E04D 1/36 |
| | | | | 52/60 |
| 2007/0199250 A1 * | 8/2007 | Haynes | .................... | E04D 1/36 |
| | | | | 52/58 |
| 2009/0229193 A1 * | 9/2009 | Ellingson | .................. | E06B 1/62 |
| | | | | 52/58 |
| 2010/0139186 A1 * | 6/2010 | Laremore | .......... | E04D 13/0315 |
| | | | | 52/200 |
| 2010/0236155 A1 * | 9/2010 | Lanza | ....................... | E04D 1/30 |
| | | | | 52/58 |
| 2013/0174496 A1 * | 7/2013 | Lanza | ....................... | E04D 1/30 |
| | | | | 52/58 |
| 2014/0134373 A1 * | 5/2014 | Kalwara | ............... | E04D 13/064 |
| | | | | 428/41.8 |

* cited by examiner

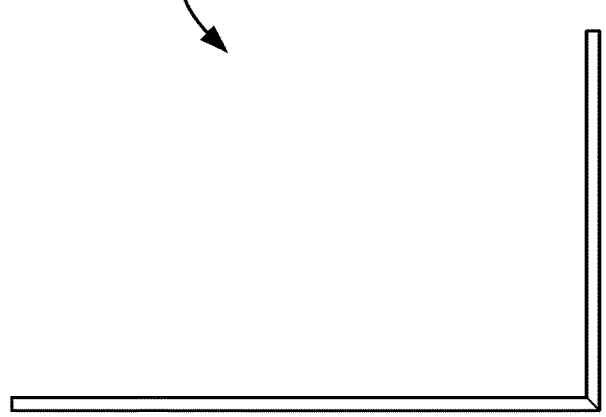
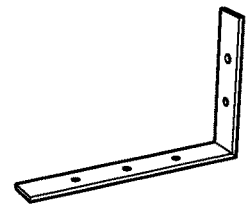
FIG. 10A
FIG. 10B
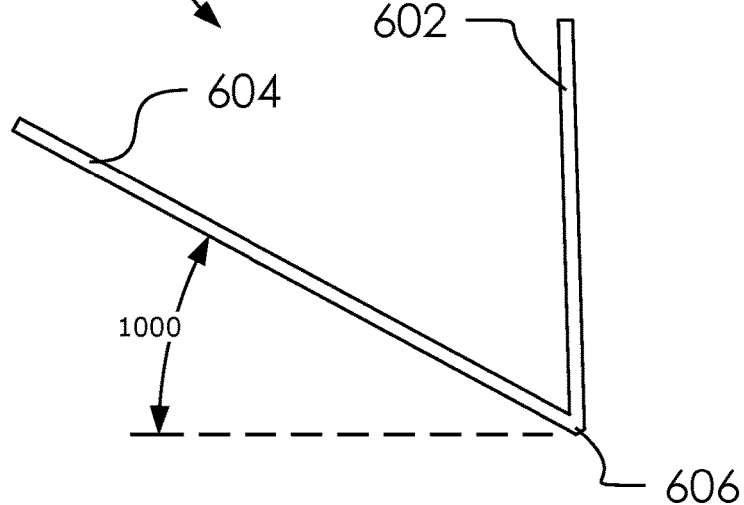
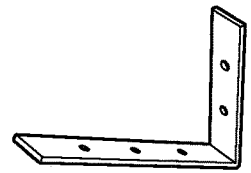
FIG. 10C
FIG. 10D

BRACKET COVER FLASHING SYSTEM AND METHOD OF USE

CROSS-REFERENCE TO RELATED APPLICATIONS

This application claims benefit to U.S. Patent Application Number(s) 62/510,909 filed on May 25, 2017.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

None of the known inventions and patents, taken either singularly or in combination, is seen to describe the instant disclosure as claimed.

BRIEF SUMMARY OF THE INVENTION

A bracket-flashing assembly for roofing in a bracket. Said bracket-flashing assembly comprise said bracket, a bracket cover and a plurality of fasteners. Said bracket comprise a plurality of fastener apertures configured to receive a portion of said plurality of fasteners to selectively attach said bracket-flashing assembly to a fixed structure and an added fixture. Said bracket comprise a first portion and a second portion. Said first portion is attached to said second portion at an elbow. Said bracket cover comprises a raised portion and a body. Said raised portion comprises a stamped portion of said raised portion being shaped to selectively encase a portion of said second portion. Said bracket cover is configured to seal a portion of said bracket by securing said second portion of said bracket to said fixed structure with a portion of said plurality of fasteners, and encasing a portion of said second portion of said bracket between said fixed structure and said bracket cover. Said raised portion comprises a depth and a width. Said second portion comprises a length, a width and a height. Said depth of said raised portion and said width of said raised portion are larger than said width and said length of said second portion. Said raised portion of said bracket cover comprise said height being larger than a thickness of said bracket. Said body of said bracket cover comprises a depth and a width. Said first portion and said second portion are adjustably attached to one another at said elbow. Said bracket comprises a pliable metal material. Said elbow comprises a bend angle. Said bend angle initially comprises a right angle but can be selectively altered to accommodate different configurations of said fixed structure and said added fixture. Said bracket cover comprises a gap below said raised portion. Said raised portion comprises said height. Said height comprise said thickness of said bracket with additional space to accommodates a head of said plurality of fasteners. Said plurality of fasteners comprise said head and a shaft. A portion of said plurality of fasteners are configured to slide through a portion of said second portion and into said fixed structure. Said raised portion covers a portion of said second portion and said head of said plurality of fasteners. Said plurality of fasteners press said bracket into a portion of said fixed structure. Said fixed structure comprises a plurality of shingles. Said bracket cover comprises aluminum in order to maintain the shape of said body and said raised portion and to maintain rust-free operation of said bracket cover in wet and dry weather conditions. Said added fixture comprise an awning.

A bracket-flashing assembly for roofing in a bracket. Said bracket-flashing assembly comprise said bracket, a bracket cover and a plurality of fasteners. Said bracket comprise a plurality of fastener apertures configured to receive a portion of said plurality of fasteners to selectively attach said bracket-flashing assembly to a fixed structure and an added fixture. Said bracket comprise a first portion and a second portion. Said first portion is attached to said second portion at an elbow. Said bracket cover comprises a raised portion and a body. Said raised portion comprises a stamped portion of said raised portion being shaped to selectively encase a portion of said second portion. Said bracket cover is configured to seal a portion of said bracket by securing said second portion of said bracket to said fixed structure with a portion of said plurality of fasteners, and encasing a portion of said second portion of said bracket between said fixed structure and said bracket cover. Said raised portion comprises a depth and a width. Said second portion comprises a length, a width and a height. Said depth of said raised portion and said width of said raised portion are larger than said width and said length of said second portion. Said raised portion of said bracket cover comprise said height being larger than a thickness of said bracket. Said body of said bracket cover comprises a depth and a width.

A method of installing a bracket-flashing assembly. Comprising sealing a portion of a bracket with a bracket cover by: securing a second portion of said bracket to a fixed structure with a portion of a fasteners, and encasing a portion of said second portion of said bracket between said fixed structure and 300. A bracket-flashing assembly comprise said bracket, said bracket cover and said plurality of fasteners. Said bracket comprise a plurality of fastener apertures configured to receive a portion of said plurality of fasteners to selectively attach said bracket-flashing assembly to said fixed structure and an added fixture. Said bracket comprise a first portion and said second portion. Said first portion is attached to said second portion at an elbow. Said bracket cover comprises a raised portion and a body. Said raised portion comprises a stamped portion of said raised portion being shaped to selectively encase a portion of said second portion. Said raised portion comprises a depth and a width. Said second portion comprises a length, a width and a height. Said depth of said raised portion and said width of said raised portion are larger than said width and said length of said second portion. Said raised portion of said bracket cover comprise said height being larger than a thickness of said bracket. Said body of said bracket comprises a depth and a width. Said first portion and said second portion are adjustably attached to one another at said elbow. Said bracket comprises a pliable metal material. Said elbow comprises a bend angle. Said bend angle initially comprises a right angle but can be selectively altered to accommodate different configurations of said fixed structure and said added fixture. Said bracket cover comprises a gap below said raised portion. Said raised portion comprises said height. Said height comprise said thickness of said bracket with additional space to accommodate a head of said plurality of fasteners. Said plurality of fasteners comprise said head and a shaft. A portion of said plurality of fasteners are configured to slide through a portion of said second portion and into said fixed structure. Said raised portion covers a portion of said second portion and said head of said plurality of fasteners. Said plurality of fasteners press said bracket into a portion of said fixed structure. Said fixed structure comprises a plurality of shingles. Said added fixture comprise an awning.

BRIEF DESCRIPTION OF THE SEVERAL VIEWS OF THE DRAWING

FIG. 3A illustrates a perspective overview view of a drilled bracket cover 300a.

FIG. 4A illustrates an elevated top side view of a drilled bracket cover 300a.

FIG. 4B illustrates an elevated front side view of a drilled bracket cover 300a.

FIG. 6A illustrates a perspective overview view of an undrilled bracket-flashing assembly 600a.

FIG. 6C illustrates a perspective overview view of an undrilled bracket-flashing assembly 600a.

FIG. 7A illustrates an elevated front side view of an undrilled bracket-flashing assembly 600a.

FIG. 10A illustrates an elevated back side view of a first configuration 1002a.

FIG. 10B illustrates a perspective back side view of a first configuration 1002a.

FIG. 10C illustrates an elevated back side view of a second configuration 1002b.

FIG. 10D illustrates a perspective back side view of a second configuration 1002b.

DETAILED DESCRIPTION OF THE INVENTION

Figure 1:
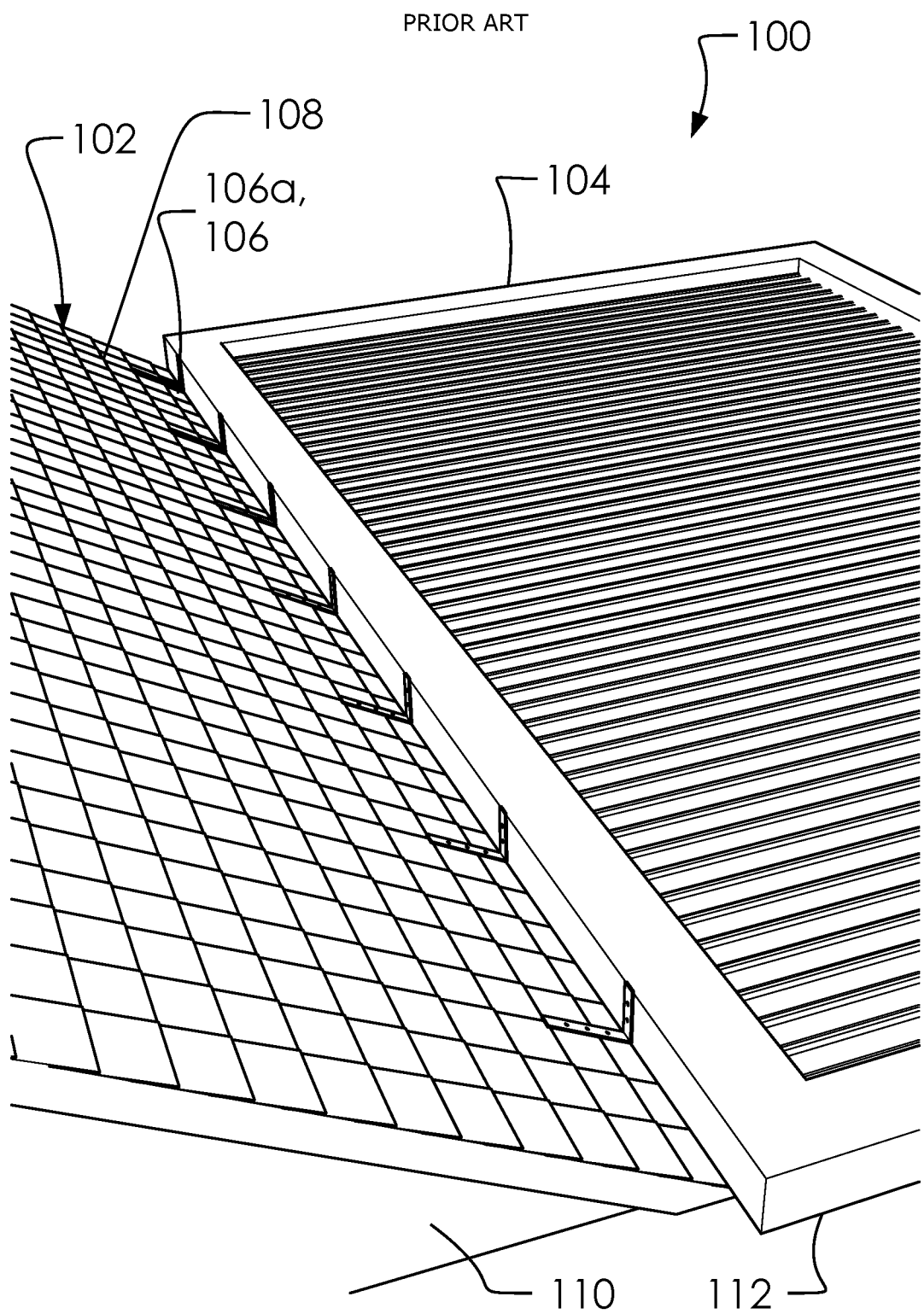
FIG. 1 illustrates a perspective overview view of a prior art shade installation 100.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:

a prior art shade installation 100
a roof 102
an awning 104
a bracket 106
a first bracket 106a
a second bracket 106b
a third bracket 106c
a fourth bracket 106d
a fifth bracket 106e
a sixth bracket 106f
a seventh bracket 106g
a plurality of shingles 108
a fixed structure 110
an added fixture 112
a sealer 200
a bracket cover 300
a drilled bracket cover 300a
an undrilled bracket cover 300b
a body 302
a raised portion 304
a plurality of fastener apertures 306
a first fastener aperture 306a
a second fastener aperture 306b
a third fastener aperture 306c
a plurality of washers 308
a depth 402
a width 404
a depth 406
a width 408
a height 410
a height 502
a bracket-flashing assembly 600
an undrilled bracket-flashing assembly 600a
a drilled bracket-flashing assembly 600b
a first portion 602
a second portion 604
an elbow 606
a plurality of fastener apertures 608
a first fastener aperture 608a a second fastener aperture 608*b*
a third fastener aperture 608*c*
a fourth fastener aperture 608*d*
a fifth fastener aperture 608*e*
a plurality of fasteners 610
a first fastener 610*a*
a second fastener 610*b*
a third fastener 610*c*
a fourth fastener 610*d*
a fifth fastener 610*e*
a width 614
a length 616
a height 618
a gap 700
a height 702
a thickness 704
a head 706
a shaft 708
a bend angle 1000
a one or more configurations 1002
a first configuration 1002*a*
a second configuration 1002*b*
an installation diagram 1100
a structure 1102
an upper portion 1104
a lower portion 1106
a middle portion 1108
a plurality of improved bracket flashing systems 1300
a prior art repair configuration 1500
a method of installing a bracket-flashing assembly 1600
a first step 1600*a*
a second step 1600*b*
a plurality of washers 1702

FIG. 1 illustrates a perspective overview view of a prior art shade installation 100.

In one embodiment, said prior art shade installation 100 can comprise said roof 102, said awning 104, said awning 104 and said bracket 106.

In one embodiment, said roof 102 can comprise said plurality of shingles 108.

In one embodiment, said bracket 106 can comprise said first bracket 106*a*, said second bracket 106*b*, said third bracket 106*c*, said fourth bracket 106*d*, said fifth bracket 106*e*, said sixth bracket 106*f* and said seventh bracket 106*g*.

In one embodiment, said prior art shade installation 100 can comprise a traditional approach for attaching said awning 104 to said roof 102; wherein, said bracket 106 are bolted into each of said awning 104 and said roof 102 and intended to hold indefinitely.

Unfortunately, many installs of said awning 104 fail to account for environmental factors such as moisture seeping into said roof 102 through installation holes created by said bracket 106 and their bolts. Although sealants are often used in the industry, the sealants in use are not sufficient to keep out moisture for long periods of time. More on this below.

As shown in said prior art shade installation 100, some installers of said awning 104 will merely drill said bracket 106 into said roof 102 through said plurality of shingles 108 without regard to the condition of said plurality of shingles 108 after the installation. The current disclosure addresses this issue as well as proposing a preferred approach to using the current system.

In one embodiment, said awning 104 can comprise a shade attached to a side of a home or structure (such as roof 102). Further, said awning 104 can be substituted for other fixtures to be attached to a structure, such as a pergola or similar. Wherein, the current system would be useful in those alternative environments, as is known in the art.

Examples of said awning 104 can include "limo wood awnings". In any case, it is known that builders are often called upon to install said awning 104 for existing and new construction.

Figure 2:
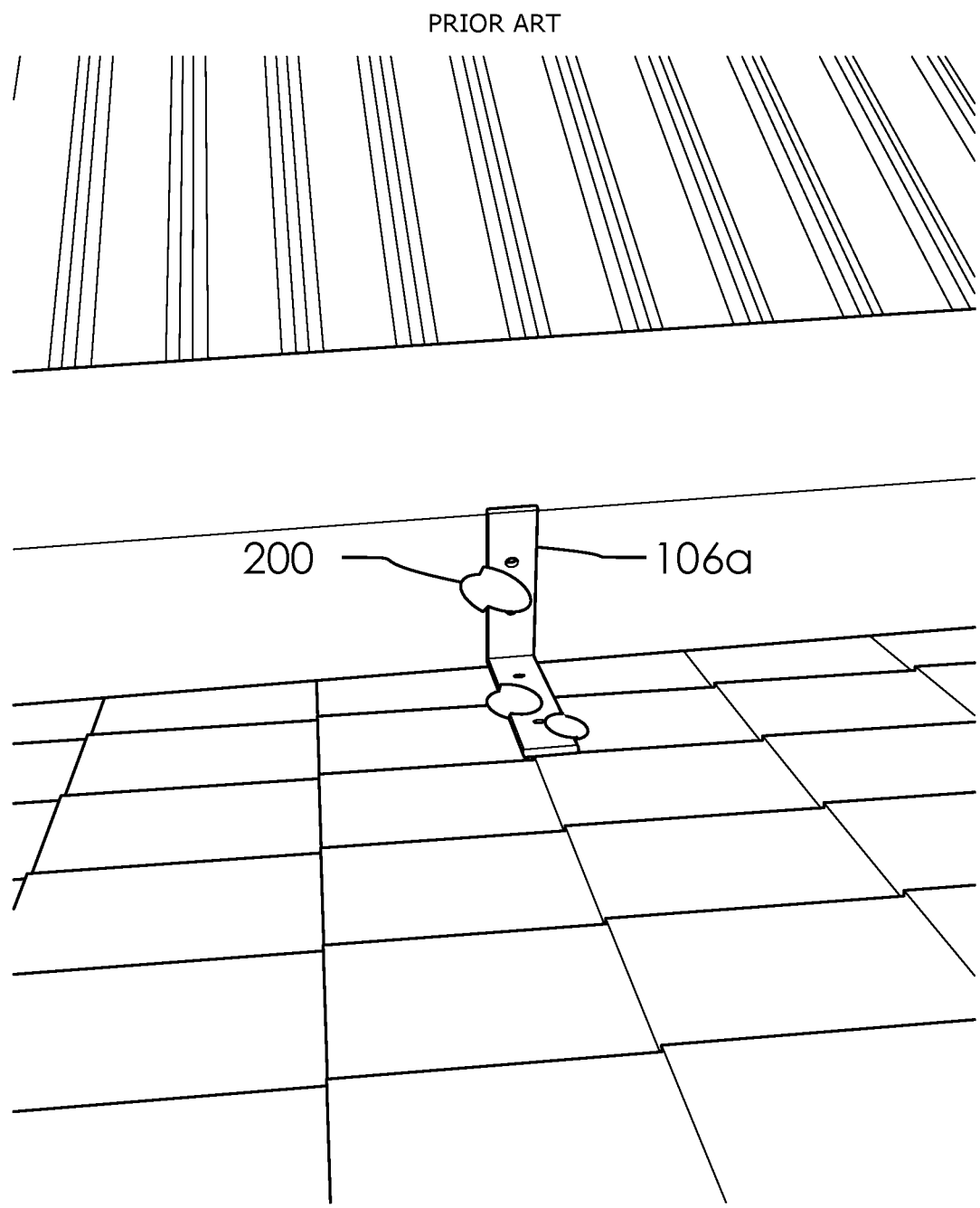
FIG. 2 illustrates a perspective overview view of a prior art shade installation 100.

FIG. 2 illustrates a perspective overview view of a prior art shade installation 100.

In one embodiment, said prior art shade installation 100 can comprise said sealer 200.

Herein, FIG. 2 comprises and illustration of the perils of the prior art approach to protecting a home when installing said awning 104 into said roof 102.

In one embodiment, said bracket 106 can be covered by said sealer 200 as a hopeful manner of preventing moisture and contaminants from seeping into said awning 104 and/or said roof 102.

Examples of said sealer 200 can comprise roofer mastic, roofer's tar, roofer's pitch, or similar, as is known in the art. Regardless the name or style, all known sealants eventually leak. Even with a liberal coating of said sealer 200, weather conditions will eventually wash away, and wear said sealer 200 to a point, as illustrated, where fasteners in said bracket 106 are no longer covered.

However, the prior art approach with said sealer 200 is well-known in the industry and common because it meets regulatory requirements. Many builders and roof installers are required to cover said bracket 106 with said sealer 200 to pass code requirements. Commonly, said sealer 200 can comprise a 2-year warranty. Suspiciously, said sealer 200 will often fail just out of warranty. A better approach would be substantially appreciated by homeowners and builders alike.

Figure 3A:
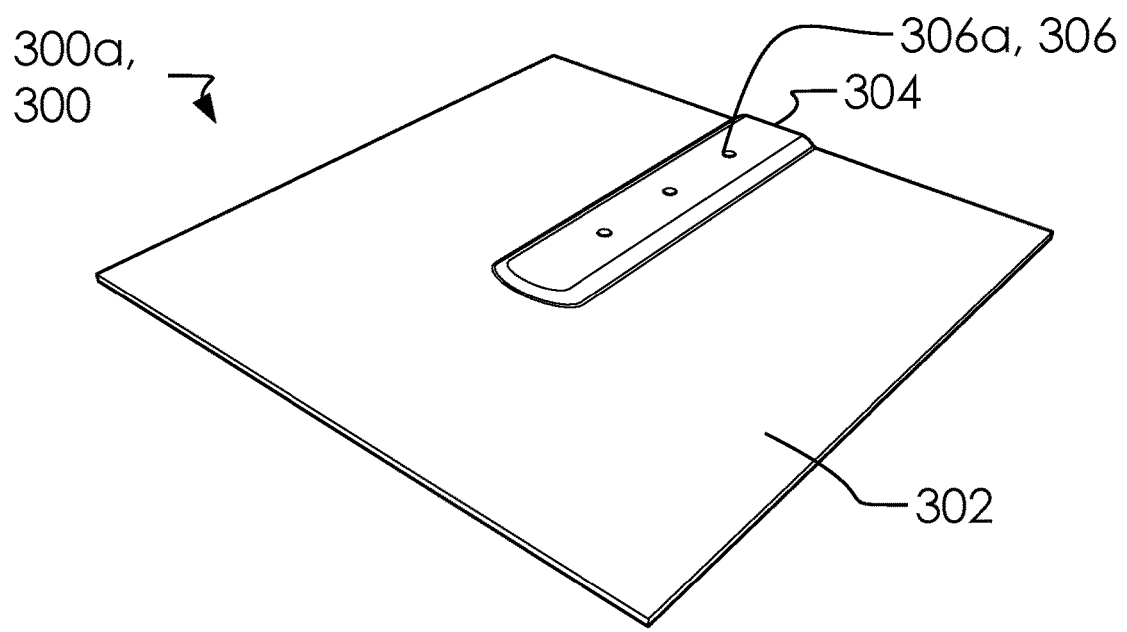

FIG. 3A illustrates a perspective overview view of a drilled bracket cover 300*a*.

Figure 3B:
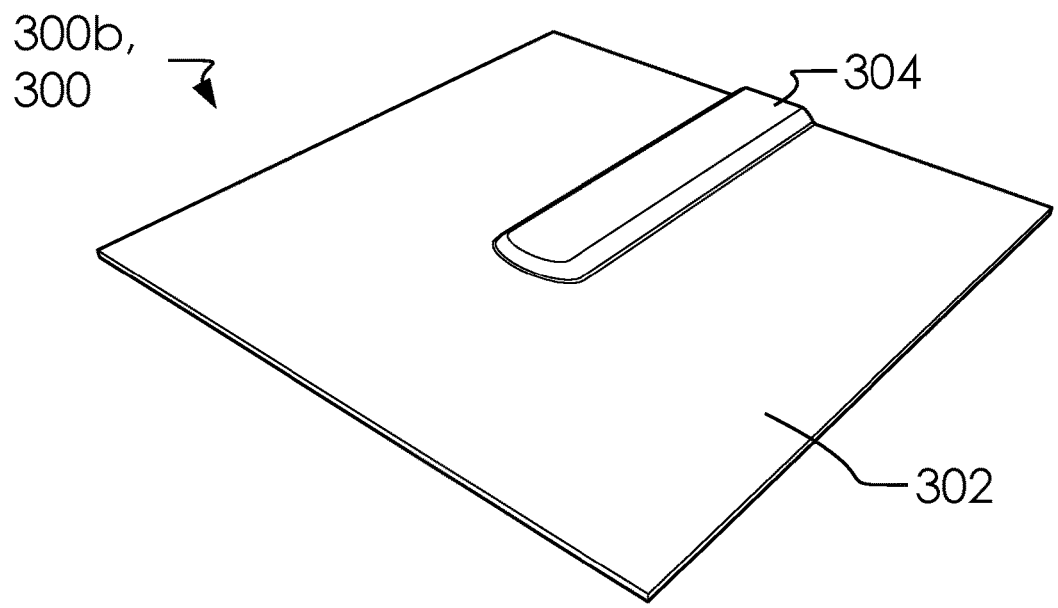
FIG. 3B illustrates a perspective overview view of an undrilled bracket cover 300b.

FIG. 3B illustrates a perspective overview view of an undrilled bracket cover 300*b*.

In one embodiment, said bracket cover 300 can comprise said drilled bracket cover 300*a*, said undrilled bracket cover 300*b*, said body 302, said raised portion 304, said raised portion 304 and said plurality of fastener apertures 306.

In one embodiment, said plurality of fastener apertures 306 can comprise said first fastener aperture 306*a*, said second fastener aperture 306*b* and said third fastener aperture 306*c*.

In one embodiment, said bracket cover 300 can be used to seal said roof 102 and said bracket 106 and solve the problems as described above and as is known in the art.

Said bracket cover 300 can comprise said body 302 with said raised portion 304 stamped into said body 302 to provide a manner of sealing in a portion of said bracket 106. In one embodiment, said body 302 can comprise 26 gage metal such as aluminum, stainless steel, galvanized billet, or similar as is known in the art. Said bracket cover 300 can comprise 8" square. Different sizes, materials and thicknesses for economic and case-by-case requirements. In one embodiment, bracket cover 300 can be constructed of stainless steel or aluminum. In a preferred embodiment, bracket cover 300 comprises aluminum in order to maintain the shape of body 302 and raised portion 304 and to ensure rust-free operation of bracket cover 300 in wet and dry weather conditions.

In one embodiment, a jig can be used to stamp out said bracket cover 300 and created said raised portion 304 and said plurality of fastener apertures 306, as is known in the art.

Figure 4A:
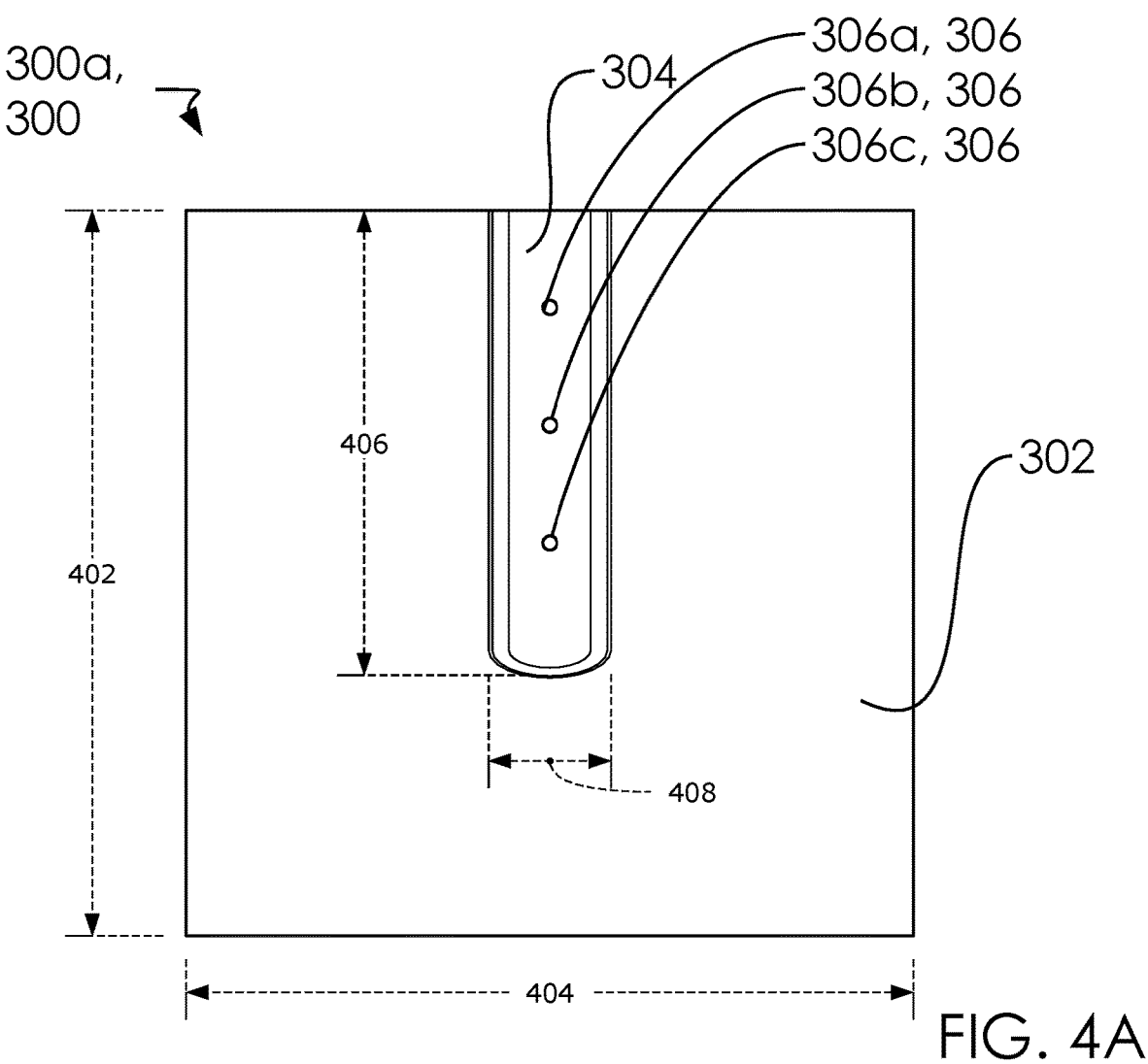

FIG. 4A illustrates an elevated top side view of a drilled bracket cover 300a.

Figure 4B:
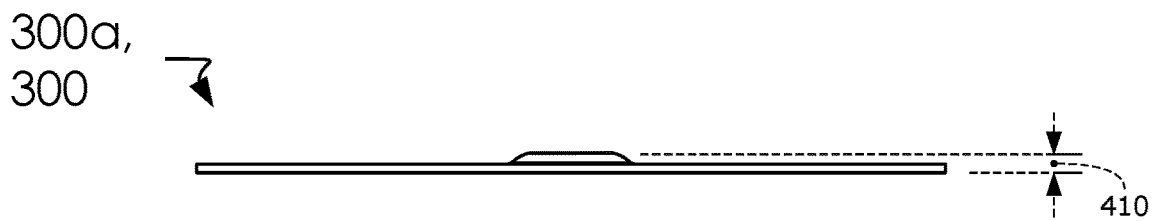

FIG. 4B illustrates an elevated front side view of a drilled bracket cover 300a.

In one embodiment, said drilled bracket cover 300a can comprise said depth 402 and said width 404.

In one embodiment, said raised portion 304 can comprise said depth 406, said width 408 and said height 410.

In one embodiment, said depth 402 and said width 404 can be equal to one another. In one embodiment, said depth 402 can be 6" or 8".

In one embodiment, said raised portion 304 can comprise a rectangular portion of said body 302 stamped so as to accommodate a portion of said bracket 106.

In one embodiment, said height 410 can comprise ½" in height.

In one embodiment, said plurality of fastener apertures 306 can be equal in number and spacing to those of said bracket 106, as is known in the art.

Figure 5A:
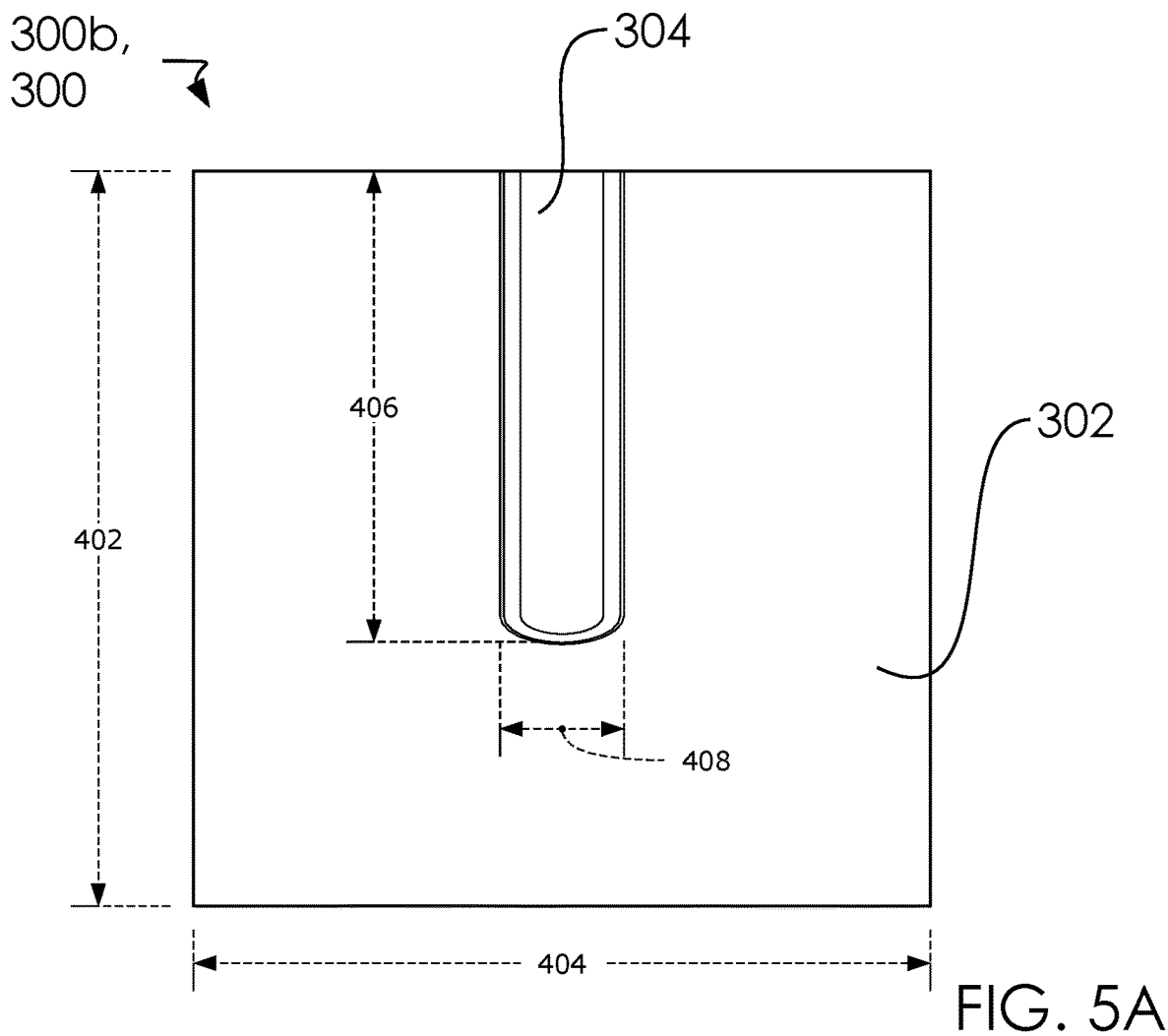
FIG. 5A illustrates an elevated top side view of an undrilled bracket cover 300b.

FIG. 5A illustrates an elevated top side view of an undrilled bracket cover 300b.

Figure 5B:
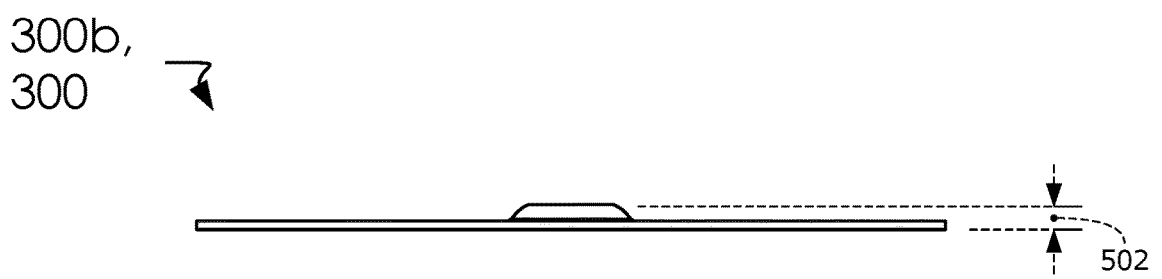
FIG. 5B illustrates an elevated front side view of an undrilled bracket cover 300b.

FIG. 5B illustrates an elevated front side view of an undrilled bracket cover 300b.

In one embodiment, said bracket 106 can comprise said height 502.

In one embodiment, said undrilled bracket cover 300b can comprise said height 502.

In one embodiment, said height 502 can comprise ¾".

Said undrilled bracket cover 300b can omit said plurality of fastener apertures 306.

Figure 6A:
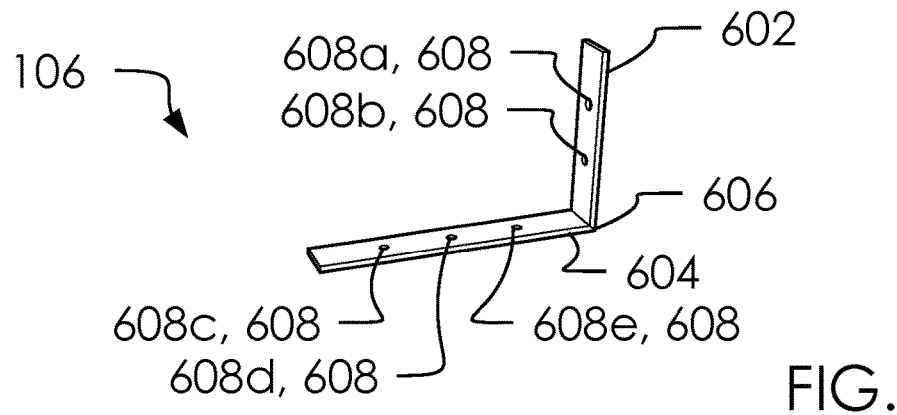

FIG. 6A illustrates a perspective overview view of an undrilled bracket-flashing assembly 600a.

Figure 6B:
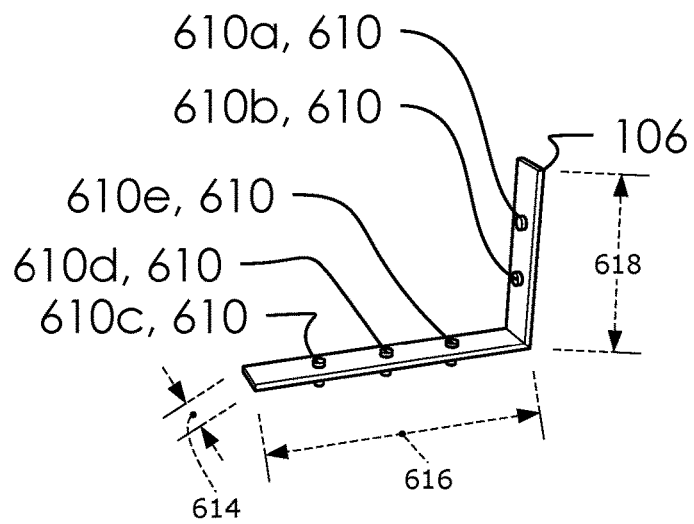
FIG. 6B illustrates a perspective overview view of an undrilled bracket-flashing assembly 600a with said one or more fasteners 610.

FIG. 6B illustrates a perspective overview view of an undrilled bracket-flashing assembly 600a with said one or more fasteners 610.

Figure 6C:
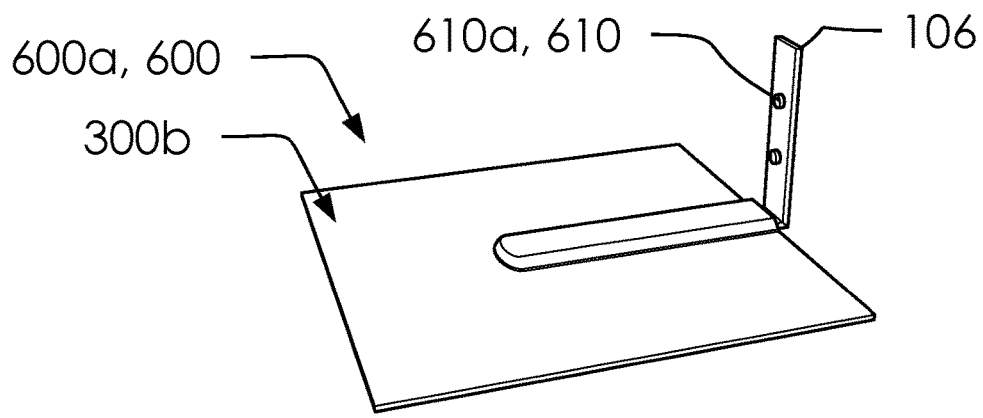

FIG. 6C illustrates a perspective overview view of an undrilled bracket-flashing assembly 600a.

In one embodiment, said bracket-flashing assembly 600 can comprise said undrilled bracket-flashing assembly 600a and said drilled bracket-flashing assembly 600b.

In one embodiment, said undrilled bracket-flashing assembly 600a can comprise said plurality of fasteners 610.

In one embodiment, said plurality of fastener apertures 608 can comprise said first fastener aperture 608a, said second fastener aperture 608b, said third fastener aperture 608c, said fourth fastener aperture 608d and said fifth fastener aperture 608e.

In one embodiment, said plurality of fasteners 610 can comprise said first fastener 610a, said second fastener 610b, said third fastener 610c, said fourth fastener 610d and said fifth fastener 610e.

In one embodiment, said drilled bracket-flashing assembly 600b can comprise said plurality of fasteners 610.

In one embodiment, said bracket 106 can comprise said bracket-flashing assembly 600, said first portion 602, said second portion 604, said elbow 606, said elbow 606, said plurality of fastener apertures 608, said fifth fastener aperture 608e, said plurality of fasteners 610, said width 614, said length 616 and said height 618.

Said second portion 604 and said first portion 602 can comprise a ½" or less thickness.

In one embodiment, said bracket-flashing assembly 600 can comprise said bracket 106, said plurality of fasteners 610 and said bracket cover 300.

In one embodiment, said plurality of fasteners 610 can slide through a portion of said bracket 106 at said plurality of fastener apertures 608, as is known in the art. Said first fastener 610a through said first fastener aperture 608a, and so on.

Said first portion 602 can comprise a substantially vertical portion of bracket 106 and second portion 604 can comprise a substantially horizontal portion of bracket 106. Wherein, bracket 106 can be said to be an L-bracket.

Figure 7A:
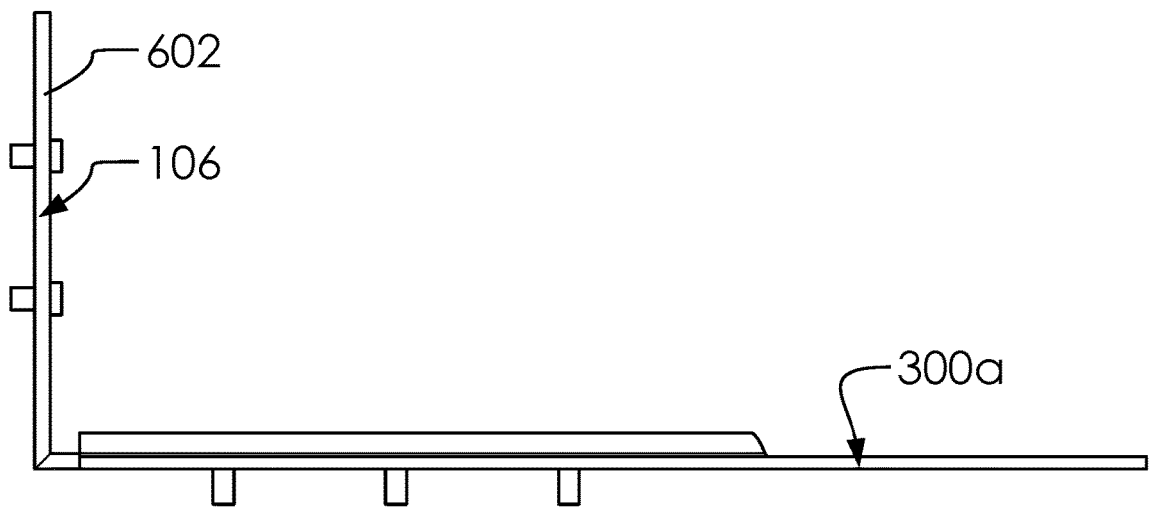

FIG. 7A illustrates an elevated front side view of an undrilled bracket-flashing assembly 600a.

Figure 7B:
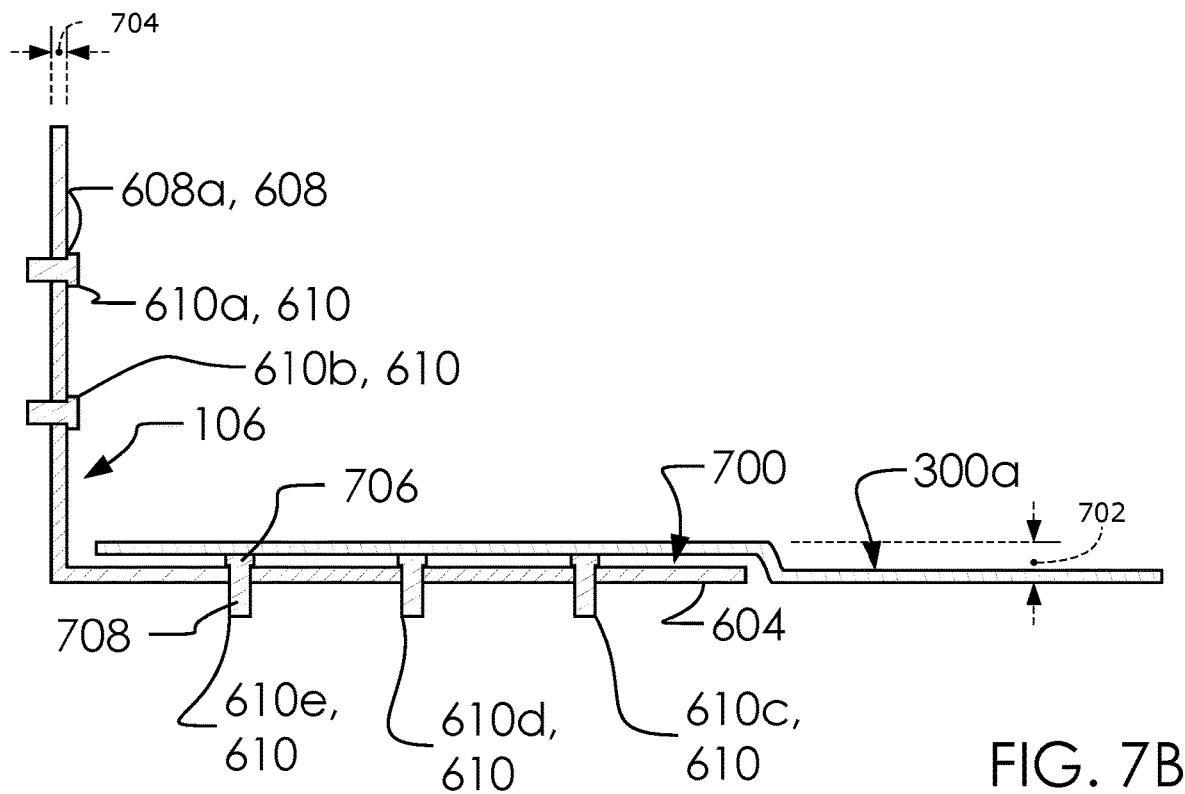
FIG. 7B illustrates an elevated front side view of an undrilled bracket-flashing assembly 600a in cross-section.

FIG. 7B illustrates an elevated front side view of an undrilled bracket-flashing assembly 600a in cross-section.

In one embodiment, said bracket 106 can comprise said thickness 704.

In one embodiment, said drilled bracket cover 300a can comprise said gap 700.

In one embodiment, said raised portion 304 can comprise said height 702.

In one embodiment, said plurality of fasteners 610 can comprise said head 706 and said shaft 708.

In one embodiment, said drilled bracket cover 300a can comprise said gap 700. In one embodiment, said gap 700 can accommodate a portion of said third fastener 610c, said fourth fastener 610d and said fifth fastener 610e, as illustrated.

Figure 8A:
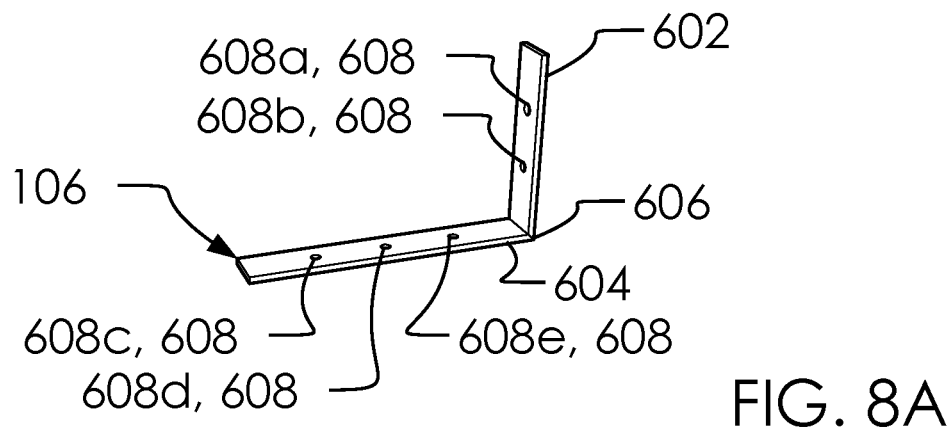
FIG. 8A illustrates a perspective overview view of a bracket 106.

FIG. 8A illustrates a perspective overview view of a bracket 106.

Figure 8B:
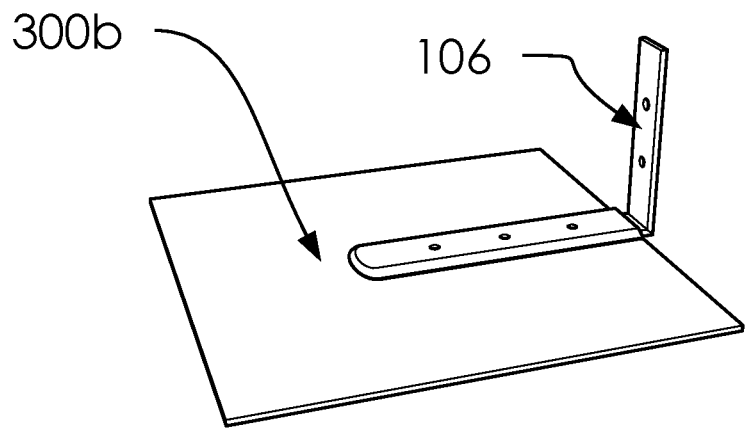
FIG. 8B illustrates a perspective overview view of a drilled bracket-flashing assembly 600b.

FIG. 8B illustrates a perspective overview view of a drilled bracket-flashing assembly 600b.

Figure 8C:
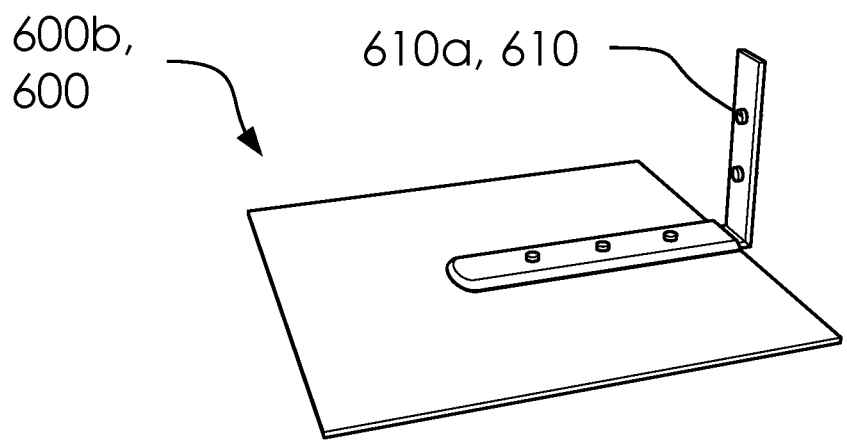
FIG. 8C illustrates a perspective overview view of a drilled bracket-flashing assembly 600b.

FIG. 8C illustrates a perspective overview view of a drilled bracket-flashing assembly 600b.

Figure 9A:
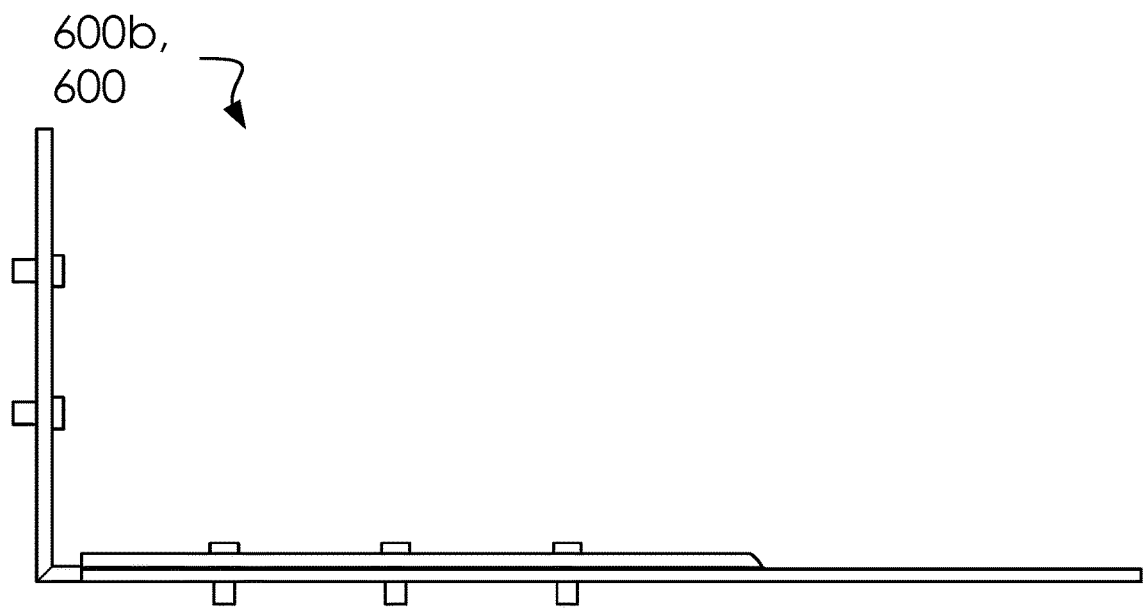
FIG. 9A illustrates an elevated front side view of a drilled bracket-flashing assembly 600b.

FIG. 9A illustrates an elevated front side view of a drilled bracket-flashing assembly 600b.

Figure 9B:
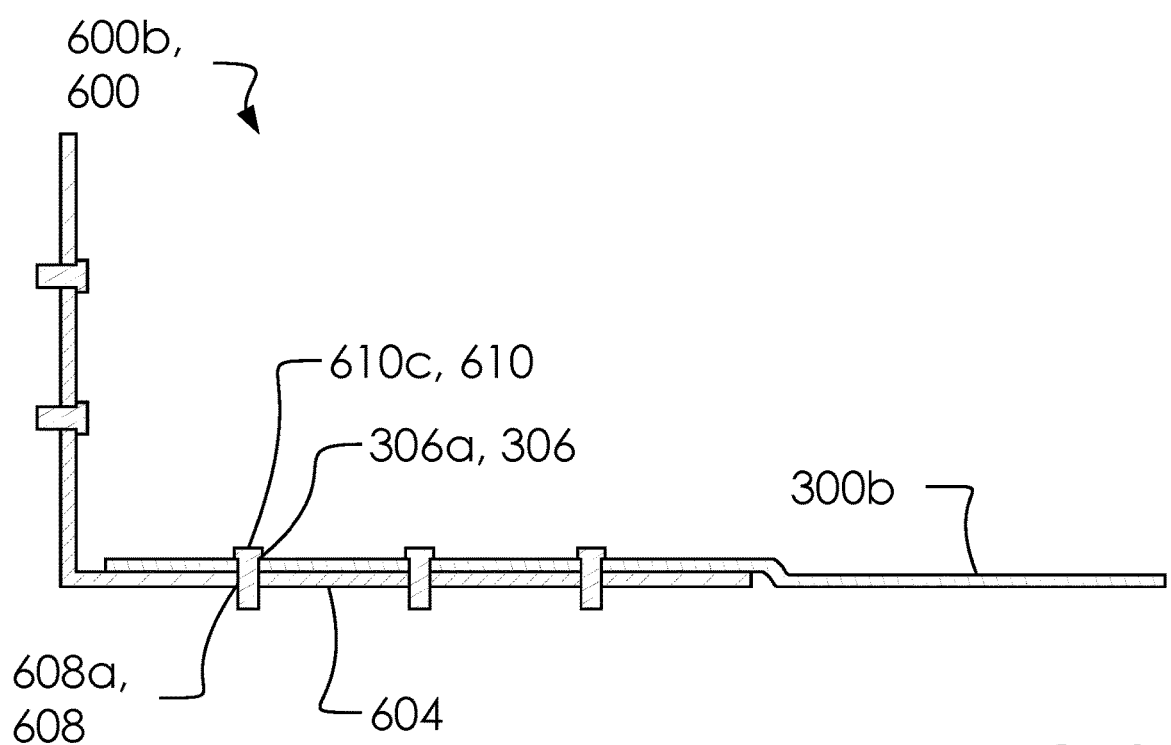
FIG. 9B illustrates an elevated front side view of a drilled bracket-flashing assembly 600b in cross-section.

FIG. 9B illustrates an elevated front side view of a drilled bracket-flashing assembly 600b in cross-section.

FIG. 10A illustrates an elevated back side view of a first configuration 1002a.

FIG. 10B illustrates a perspective back side view of a first configuration 1002a.

FIG. 10C illustrates an elevated back side view of a second configuration 1002b.

FIG. 10D illustrates a perspective back side view of a second configuration 1002b.

In one embodiment, said one or more configurations 1002 can comprise said first configuration 1002a and said second configuration 1002b.

In one embodiment, said bracket 106 can comprise said bend angle 1000 and said one or more configurations 1002.

In one embodiment, said bracket 106 can be modified by end users to match an installation objective, such as the pitch of a roof, as is known in the art.

Figure 11:
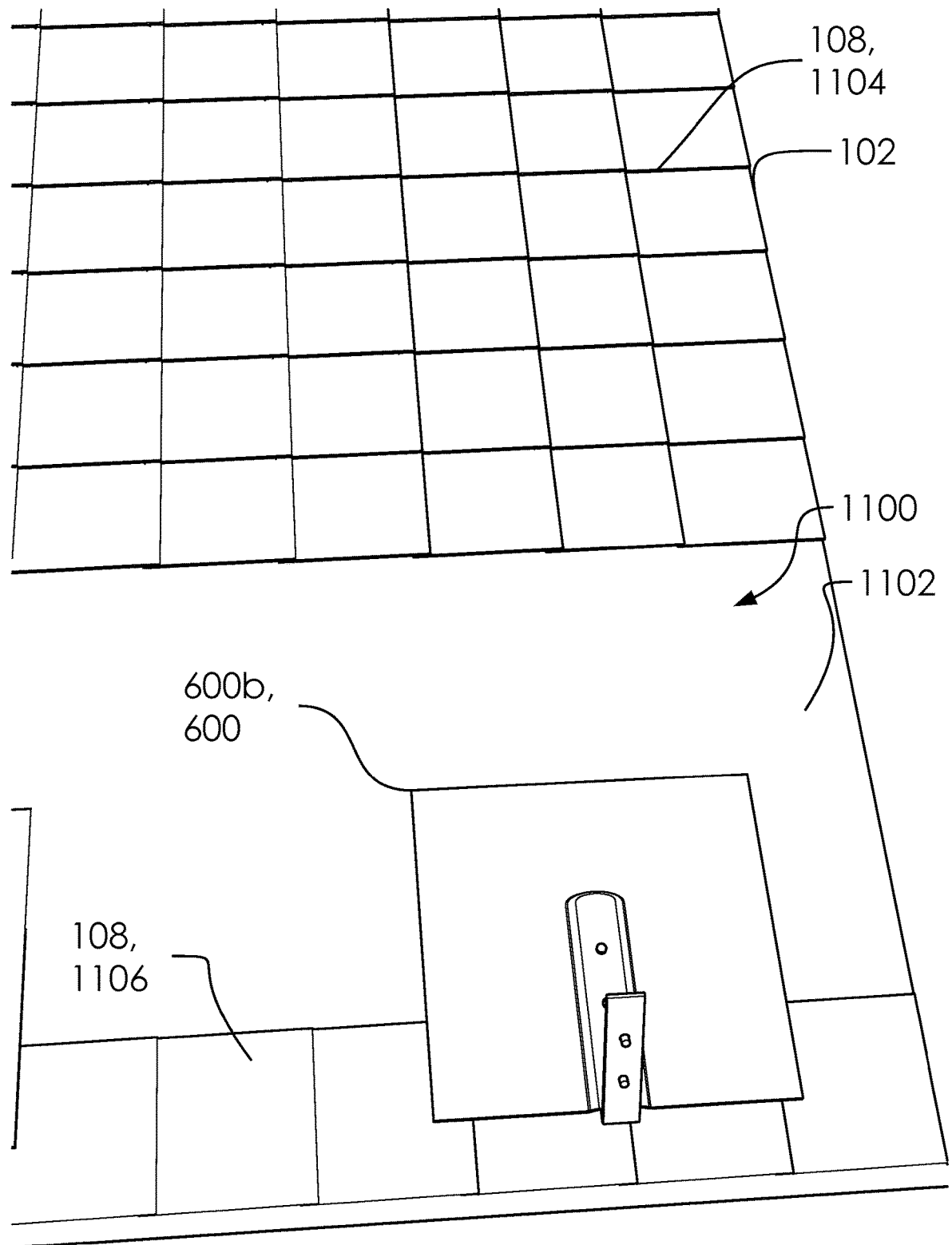
FIG. 11 illustrates a perspective overview view of an installation diagram 1100.

FIG. 11 illustrates a perspective overview view of an installation diagram 1100.

In one embodiment, said plurality of fasteners 610 can comprise said installation diagram 1100.

In one embodiment, said plurality of shingles 108 can comprise said upper portion 1104, said lower portion 1106 and said middle portion 1108.

In one embodiment, said bracket cover 300 can be "roofed in", as is known in the art, so as to be stacked between a portion of said plurality of shingles 108. For example, in one embodiment, said plurality of shingles 108 can comprise said upper portion 1104, said lower portion 1106 and said middle portion 1108 (illustrated below). A portion of said bracket-flashing assembly 600 can sit on top of said lower portion 1106, and below a portion of said upper portion 1104 and said middle portion 1108.

Figure 12:
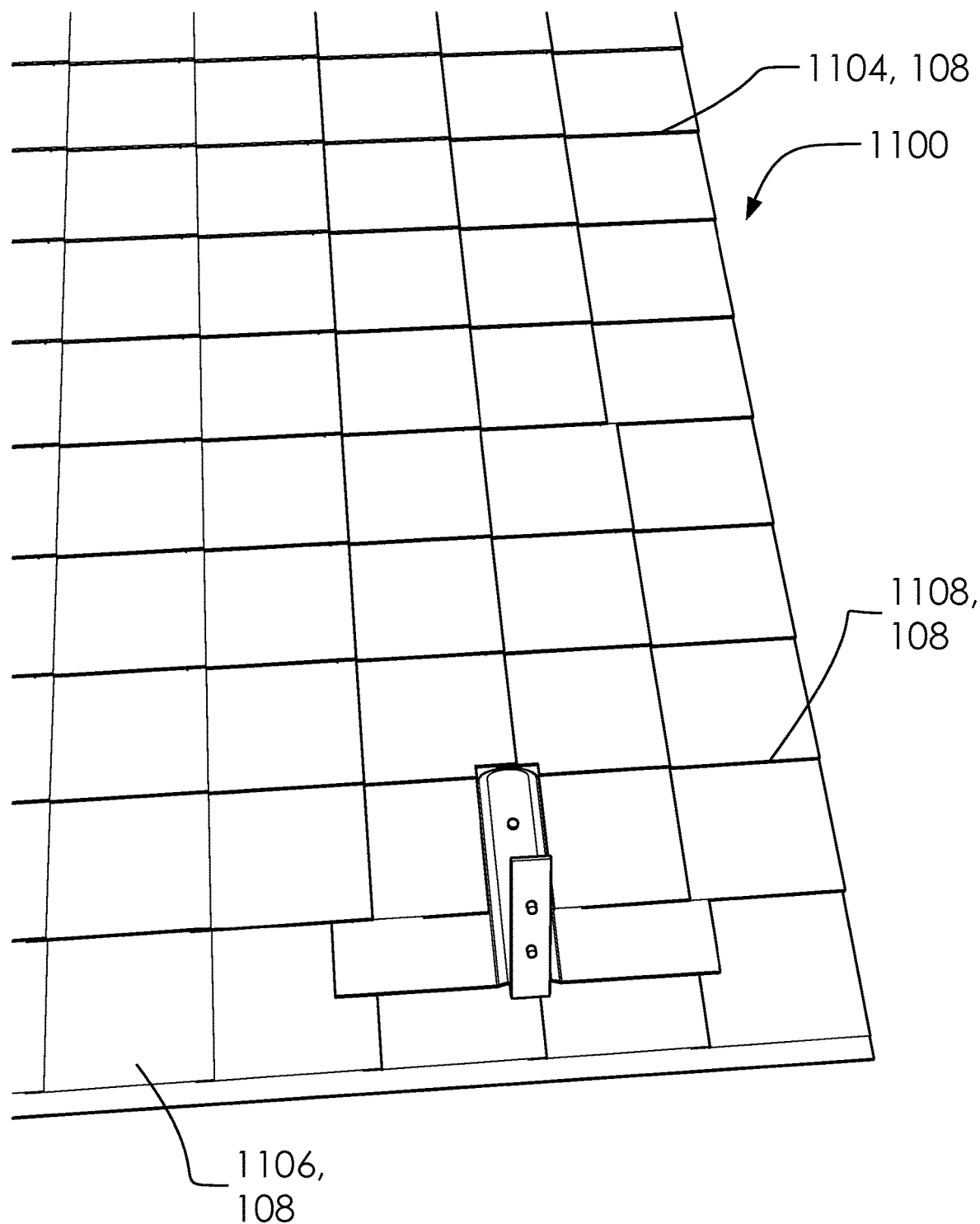
FIG. 12 illustrates a perspective overview view of an installation diagram 1100.

FIG. 12 illustrates a perspective overview view of an installation diagram 1100.

In one embodiment, said installation diagram 1100 can be installed by next installing a portion of said plurality of shingles 108 on said structure 1102.

In one embodiment, a portion of said body 302 can be screwed down. In one embodiment, said body 302 can also be referred to as a flashing.

In one embodiment, said bracket-flashing assembly 600 can be installed in a manner similar to vent fans, as is known in the art. This is the process called "roofed in". Pulling up a portion of said plurality of shingles 108, installing said bracket cover 300, cutting away a portion of said plurality of shingles 108 and bolting everything down.

In one embodiment, a water channel can form along said raised portion 304 allowing water to drain along said bracket 106 instead of seeping into a structure.

Figure 13:
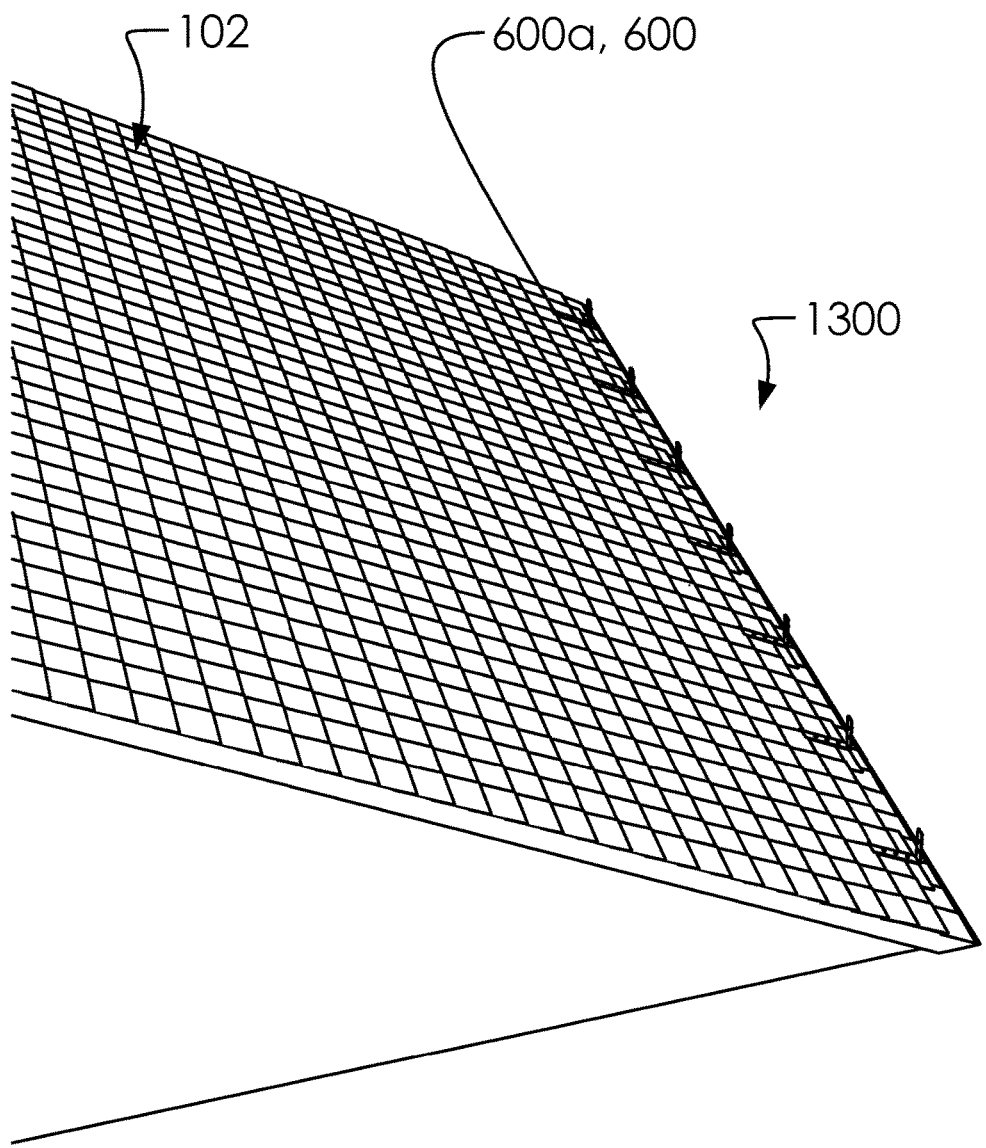
FIG. 13 illustrates a perspective overview view of a plurality of improved bracket flashing systems 1300.

FIG. 13 illustrates a perspective overview view of a plurality of improved bracket flashing systems 1300.

Figure 14:
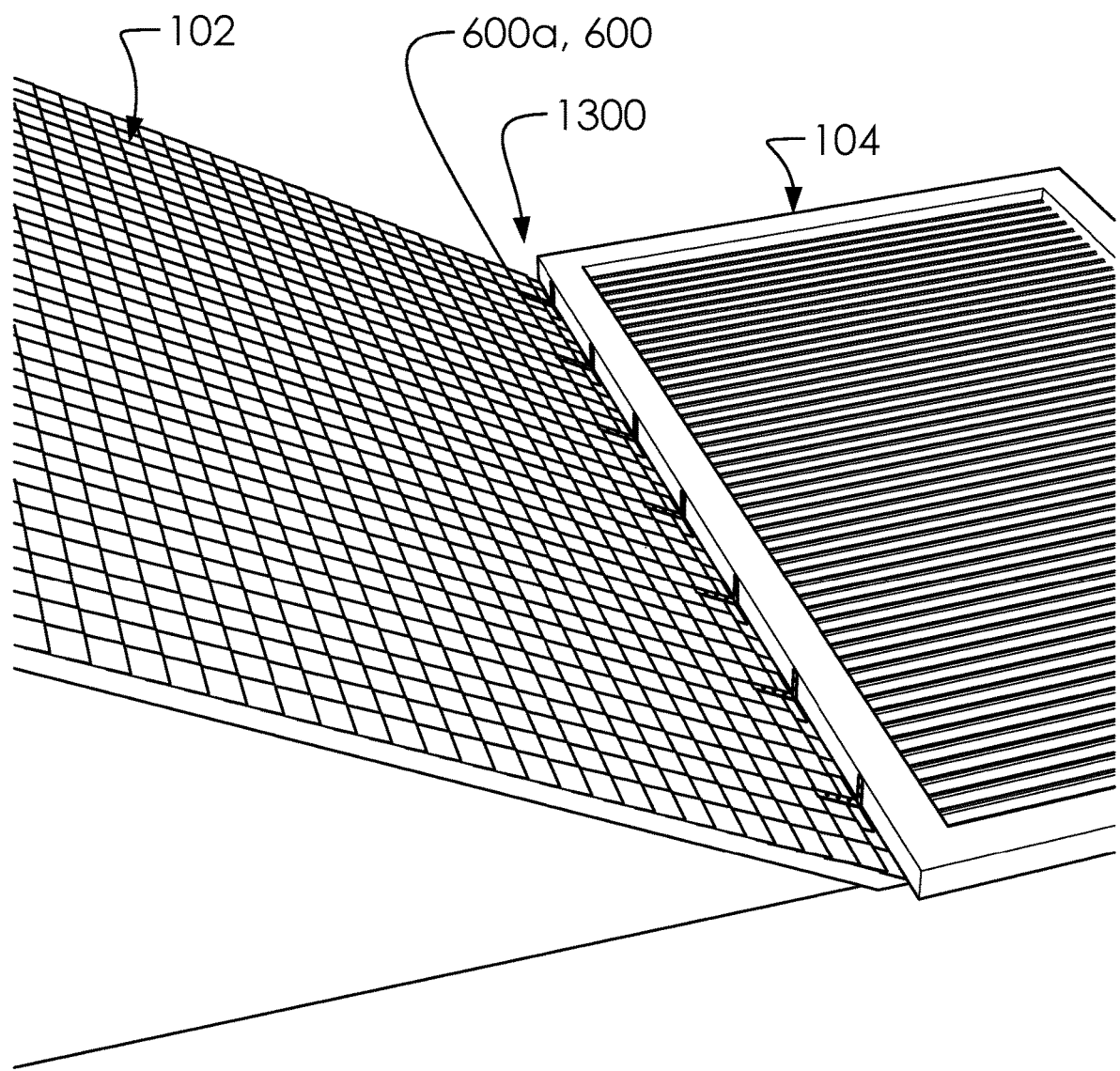
FIG. 14 illustrates a perspective overview view of a plurality of improved bracket flashing systems 1300.

FIG. 14 illustrates a perspective overview view of a plurality of improved bracket flashing systems 1300.

Figure 15:
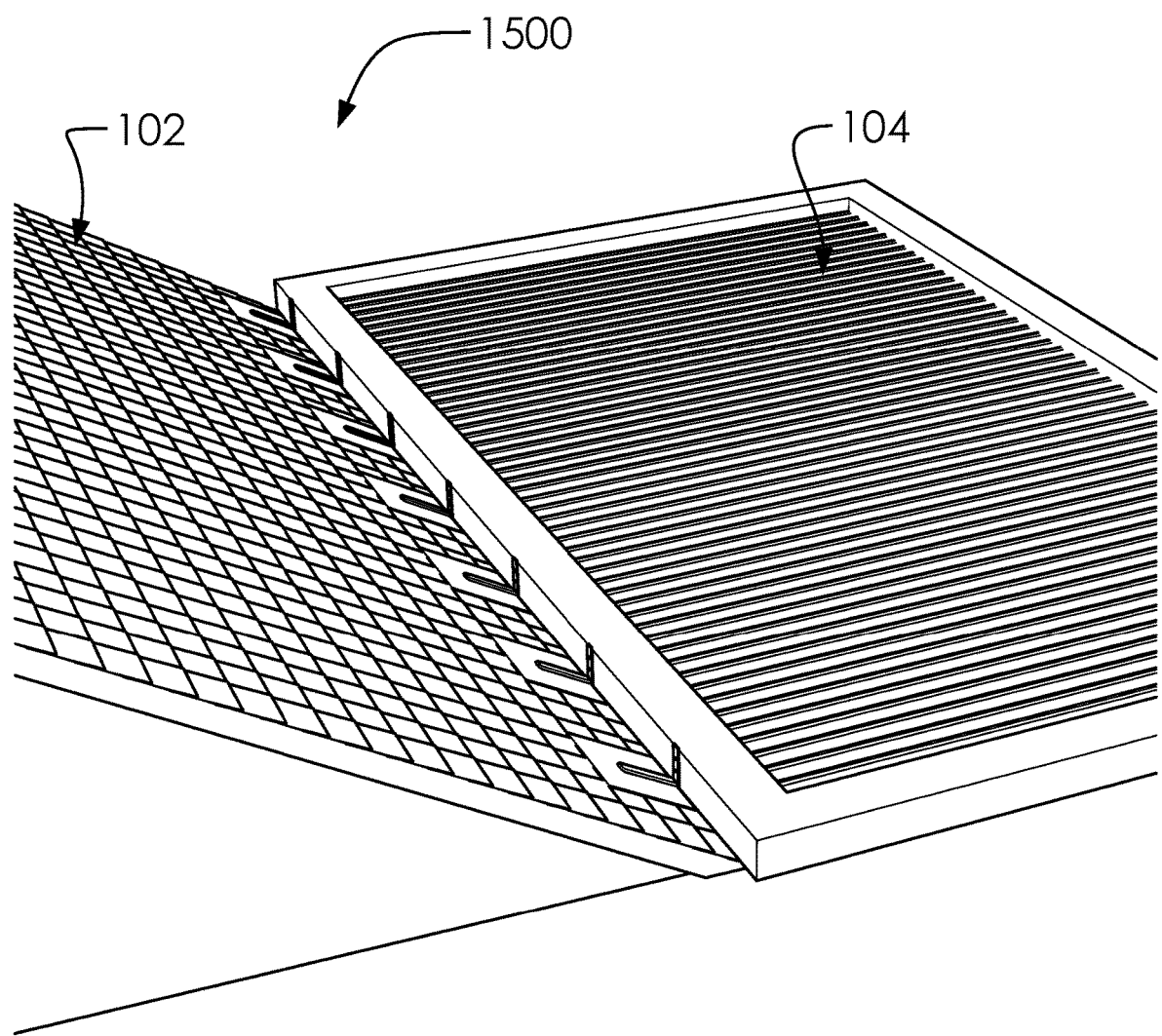
FIG. 15 illustrates a perspective overview view of a prior art repair configuration 1500.

In one embodiment, said installation diagram 1100 can be installed by next installing a portion of said inserting FIG. 15 illustrates a perspective overview view of a prior art repair configuration 1500.

In one embodiment, said bracket cover 300 can be used to correct said prior art shade installation 100, by attaching said undrilled bracket cover 300b into said plurality of shingles 108 above said bracket 106. This can comprise a minimum effort to correcting the failures of said sealer 200.

Figure 16:
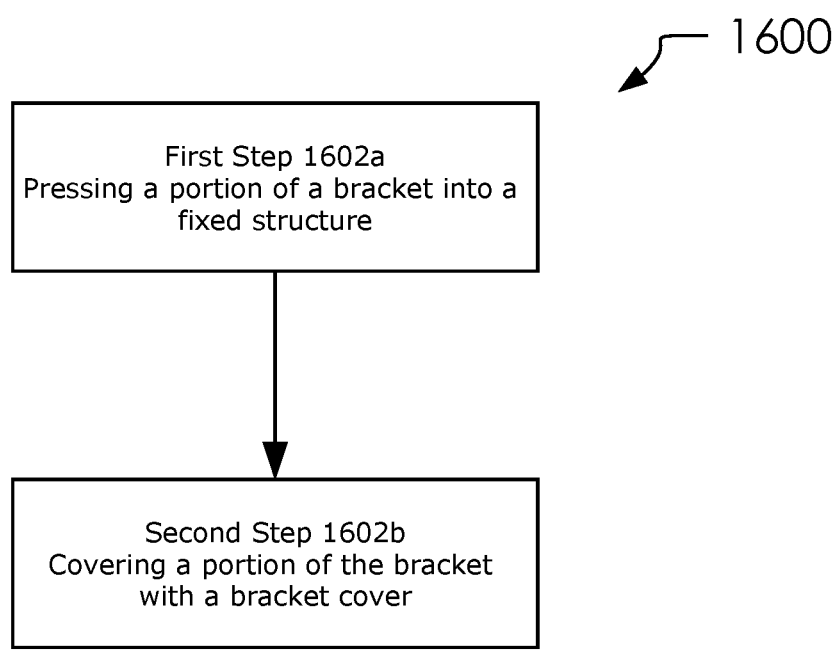
FIG. 16 illustrates a flow chart.

FIG. 16 illustrates a flow chart.

Figure 17:
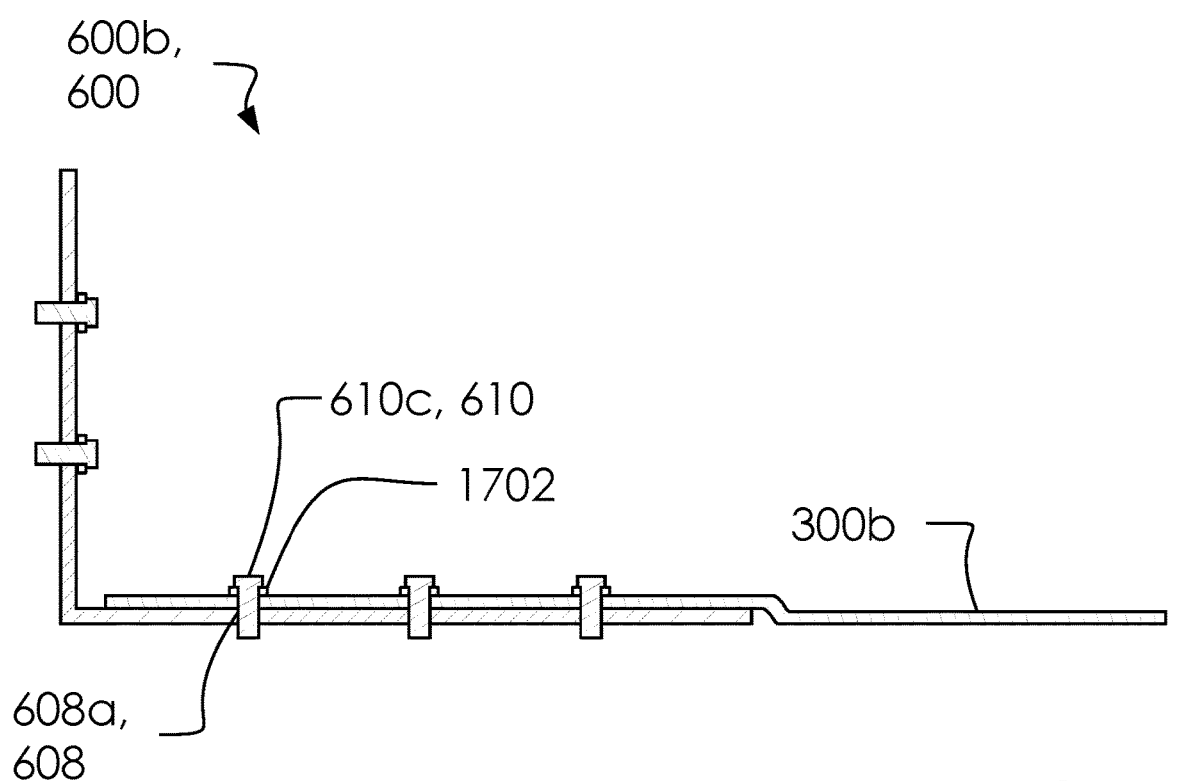
FIG. 17 illustrates an elevated side view in section cut of drilled bracket-flashing assembly 600b.

FIG. 17 illustrates an elevated side view in section cut of drilled bracket-flashing assembly 600b.

The following sentences are included for completeness of this disclosure with reference to the claims.

A bracket-flashing assembly 600 for roofing in a bracket 106. Said bracket-flashing assembly 600 comprise said bracket 106, a bracket cover 300 and a plurality of fasteners 610. Said bracket 106 comprise a plurality of fastener apertures 608 configured to receive a portion of said plurality of fasteners 610 to selectively attach said bracket-flashing assembly 600 to a fixed structure 110 and an added fixture 112. Said bracket 106 comprise a first portion 602 and a second portion 604. Said first portion 602 is attached to said second portion 604 at an elbow 606. Said bracket cover 300 comprises a raised portion 304 and a body 302. Said raised portion 304 comprises a stamped portion of said raised portion 304 being shaped to selectively encase a portion of said second portion 604. Said bracket cover 300 is configured to seal a portion of said bracket 106 by securing said second portion 604 of said bracket 106 to said fixed structure 110 with a portion of said plurality of fasteners 610, and encasing a portion of said second portion 604 of said bracket 106 between said fixed structure 110 and said bracket cover 300. Said raised portion 304 comprises a depth 406 and a width 408. Said second portion 604 comprises a length 616, a width 614 and a height 702. Said depth 406 of said raised portion 304 and said width 408 of said raised portion 304 are larger than said width 614 and said length 616 of said second portion 604. Said raised portion 304 of said bracket cover 300 comprise said height 702 being larger than a thickness 704 of said bracket 106. Said body 302 of said bracket cover 300 comprises a depth 402 and a width 404. Said first portion 602 and said second portion 604 are adjustably attached to one another at said elbow 606. Said bracket 106 comprises a pliable metal material. Said elbow 606 comprises a bend angle 1000. Said bend angle 1000 initially comprises a right angle but can be selectively altered to accommodate different configurations of said fixed structure 110 and said added fixture 112. Said bracket cover 300 comprises a gap 700 below said raised portion 304. Said raised portion 304 comprises said height 702. Said height 702 comprise said thickness 704 of said bracket 106 with additional space to accommodate a head 706 of said plurality of fasteners 610. Said plurality of fasteners 610 comprise said head 706 and a shaft 708. A portion of said plurality of fasteners 610 are configured to slide through a portion of said second portion 604 and into said fixed structure 110. Said raised portion 304 covers a portion of said second portion 604 and said head 706 of said plurality of fasteners 610. Said plurality of fasteners 610 press said bracket 106 into a portion of said fixed structure 110. Said fixed structure 110 comprises a plurality of shingles 108. Said bracket cover 300 comprises aluminum in order to maintain the shape of said body 302 and said raised portion 304 and to maintain rust-free operation of said bracket cover 300 in wet and dry weather conditions. Said added fixture 112 comprise an awning 104. A bracket-flashing assembly 600 for roofing in a bracket 106.

Said bracket-flashing assembly 600 comprise said bracket 106, a bracket cover 300 and a plurality of fasteners 610. Said bracket 106 comprise a plurality of fastener apertures 608 configured to receive a portion of said plurality of fasteners 610 to selectively attach said bracket-flashing assembly 600 to a fixed structure 110 and an added fixture 112. Said bracket 106 comprise a first portion 602 and a second portion 604. Said first portion 602 is attached to said second portion 604 at an elbow 606. Said bracket cover 300 comprises a raised portion 304 and a body 302. Said raised portion 304 comprises a stamped portion of said raised portion 304 being shaped to selectively encase a portion of said second portion 604. Said bracket cover 300 is configured to seal a portion of said bracket 106 by securing said second portion 604 of said bracket 106 to said fixed structure 110 with a portion of said plurality of fasteners 610, and encasing a portion of said second portion 604 of said bracket 106 between said fixed structure 110 and said bracket cover 300. Said raised portion 304 comprises a depth 406 and a width 408. Said second portion 604 comprises a length 616, a width 614 and a height 702. Said depth 406 of said raised portion 304 and said width 408 of said raised portion 304 are larger than said width 614 and said length 616 of said second portion 604. Said raised portion 304 of said bracket cover 300 comprise said height 702 being larger than a thickness 704 of said bracket 106. Said body 302 of said bracket cover 300 comprises a depth 402 and a width 404.

Said bracket cover 300 comprises aluminum in order to maintain the shape of said body 302 and said raised portion 304 and to maintain rust-free operation of said bracket cover 300 in wet and dry weather conditions.

Said fixed structure 110 comprises a roof 102 with a plurality of shingles 108. Said added fixture 112 comprise an awning 104.

Said first portion 602 and said second portion 604 are adjustably attached to one another at said elbow 606. Said bracket 106 comprises a pliable metal material. Said elbow 606 comprises a bend angle 1000. Said bend angle 1000 initially comprises a right angle but can be selectively altered to accommodate different configurations of said fixed structure 110 and said added fixture 112.

Said bracket cover 300 comprises stainless steel.

Said bracket cover 300 comprises aluminum in order to maintain the shape of said body 302 and said raised portion 304 and to maintain rust-free operation of said bracket cover 300 in wet and dry weather conditions.

Said bracket cover 300 comprises a gap 700 below said raised portion 304. Said raised portion 304 comprises said height 702. Said height 702 comprise said thickness 704 of said bracket 106 with additional space to accommodate a head 706 of said plurality of fasteners 610. Said plurality of fasteners 610 comprise said head 706 and a shaft 708. A portion of said plurality of fasteners 610 are configured to slide through a portion of said second portion 604 and into said fixed structure 110. Said raised portion 304 covers a portion of said second portion 604 and said head 706 of said plurality of fasteners 610. Said plurality of fasteners 610 press said bracket 106 into a portion of said fixed structure 110.

Said bracket cover 300 comprises a gap 700 below said raised portion 304. Said raised portion 304 comprises said height 702. Said height 702 comprise said thickness 704 of said bracket 106 with additional space to accommodate a head 706 of said plurality of fasteners 610. Said plurality of fasteners 610 comprise said head 706 and a shaft 708. A portion of said plurality of fasteners 610 are configured to slide through a portion of said second portion 604 and into said fixed structure 110. Said raised portion 304 covers a portion of said second portion 604 and said head 706 of said plurality of fasteners 610. Said plurality of fasteners 610 press said bracket 106 into a portion of said fixed structure 110.

Said bracket cover 300 comprises a plurality of fastener apertures 306. Said plurality of fastener apertures 306 are configured to align with a portion of said plurality of fastener apertures 608 in said second portion 604 of said bracket 106. A portion of said plurality of fasteners 610 are configured to slide through a portion of said bracket cover 300, said second portion 604 and into said fixed structure 110. Said plurality of fasteners 610 comprise a head 706 and a shaft 708. Said head 706 of said plurality of fasteners 610 fit above said raised portion 304 and press said bracket cover 300 and said bracket 106 into a portion of said fixed structure 110.

Said bracket-flashing assembly 600 further comprises a plurality of washers 1702. Said plurality of fasteners 610 attach said bracket-flashing assembly 600 to said fixed structure 110 and/or said added fixture 112 by first passing through said plurality of washers 1702 prior to parts of said bracket cover 300 and/or said bracket 106. Said head 706 press a portion of said plurality of washers 1702 into said bracket-flashing assembly 600 and maintain a seal between said plurality of washers 1702 at said plurality of fastener apertures 306 of said bracket cover 300 and/or said plurality of fastener apertures 608 of said bracket 106.

Said fixed structure 110 comprises a plurality of shingles 108. Said added fixture 112 comprise an awning 104.

A portion of said body 302 is configured to fit under a portion of a plurality of shingles 108 of a roof 102 of said fixed structure 110.

A portion of a plurality of shingles 108 are cut away to accommodate said raised portion 304 of said bracket cover 300.

A portion of said body 302 is configured to fit under a portion of a plurality of shingles 108 of a roof 102 of said fixed structure 110. A method of installing a bracket-flashing assembly 1600. Comprising Seal a portion of a bracket 106 with a bracket cover 300 by: securing a second portion 604 of said bracket 106 to a fixed structure 110 with a portion of a plurality of fasteners 610, and encasing a portion of said second portion 604 of said bracket 106 between said fixed structure 110 and 300. A bracket-flashing assembly 600 comprise said bracket 106, said bracket cover 300 and said plurality of fasteners 610. Said bracket 106 comprise a plurality of fastener apertures 608 configured to receive a portion of said plurality of fasteners 610 to selectively attach said bracket-flashing assembly 600 to said fixed structure 110 and an added fixture 112. Said bracket 106 comprise a first portion 602 and said second portion 604. Said first portion 602 is attached to said second portion 604 at an elbow 606. Said bracket cover 300 comprises a raised portion 304 and a body 302. Said raised portion 304 comprises a stamped portion of said raised portion 304 being shaped to selectively encase a portion of said second portion 604. Said raised portion 304 comprises a depth 406 and a width 408. Said second portion 604 comprises a length 616, a width 614 and a height 702. Said depth 406 of said raised portion 304 and said width 408 of said raised portion 304 are larger than said width 614 and said length 616 of said second portion 604. Said raised portion 304 of said bracket cover 300 comprise said height 702 being larger than a thickness 704 of said bracket 106. Said body 302 of said bracket 106 comprises a depth 402 and a width 404. Said first portion 602 and said second portion 604 are adjustably attached to one another at said elbow 606. Said bracket 106 comprises a pliable metal material. Said elbow 606 comprises a bend angle 1000. Said bend angle 1000 initially comprises a right angle but can be selectively altered to accommodate different configurations of said fixed structure 110 and said added fixture 112. Said bracket cover 300 comprises a gap 700 below said raised portion 304. Said raised portion 304 comprises said height 702. Said height 702 comprise said thickness 704 of said bracket 106 with additional space to accommodate a head 706 of said plurality of fasteners 610. Said plurality of fasteners 610 comprise said head 706 and a shaft 708. A portion of said plurality of fasteners 610 are configured to slide through a portion of said second portion 604 and into said fixed structure 110. Said raised portion 304 covers a portion of said second portion 604 and said head 706 of said plurality of fasteners 610. Said plurality of fasteners 610 press said bracket 106 into a portion of said fixed structure 110. Said fixed structure 110 comprises a plurality of shingles 108. Said added fixture 112 comprise an awning 104.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A bracket-flashing assembly for roofing in a bracket, wherein:

said bracket-flashing assembly comprises said bracket, a bracket cover and a plurality of fasteners;

said bracket comprises a plurality of fastener apertures configured to receive a portion of said plurality of fasteners to selectively attach said bracket-flashing assembly to a fixed structure;

said bracket comprises an L-bracket comprising a first portion for attaching to an added fixture and a second portion for attaching to said fixed structure;

said first portion is attached to said second portion at an elbow;

said elbow comprises a bend angle between said first portion and said second portion;

said bracket cover comprises a raised portion and a body;

said raised portion in said bracket cover is shaped to encase a portion of said second portion of said bracket;

said body comprises a rectangular sheet of metal;

said raised portion beginning at one edge of said body and extending toward an opposite edge of said body;

said raised portion is surrounded by a planar flat portion on three sides, and a raised open end to receive a portion said second portion of said L-bracket;

said planar flat portion of said body said is configured to fit under a portion of a plurality of shingles of a roof of said fixed structure due to its planar shape;

said bracket cover seals a portion of said bracket by encasing a portion of said second portion of said bracket between said fixed structure and said bracket cover;

said raised portion comprises a depth and a width;

said second portion of said bracket comprises a length, a width and a height;

said depth and said width of said raised portion are larger than said width and said length of said second portion of said bracket;

said raised portion of said bracket cover comprises said height being larger than a thickness of said second portion of said bracket;

said body of said bracket cover comprises a depth and a width;

said bracket cover is configured to seal a portion of said bracket by encasing a portion of said second portion of said bracket in said raised portion between said fixed structure and said bracket cover; and said bracket consists of a pliable metal material selected among aluminum, stainless steel, and galvanized billet; and wherein said second portion of said bracket is installed on a surface of a roof and said bracket cover is installed over said second portion such that a plurality of shingles cover said planar flat portion of said bracket cover on said three sides.

2. The bracket-flashing assembly from claim 1, wherein:
said fixed structure comprises a roof with a plurality of shingles; and
said added fixture comprises an awning.

3. The bracket-flashing assembly from claim 1, wherein:
said bracket consists of a 26 gage metal.

4. The bracket-flashing assembly from claim 3, wherein:
said bracket cover comprises a gap below said raised portion;
said height of said raised portion is large enough to accommodate said thickness of said bracket with additional space to accommodate a head of said plurality of fasteners;
said plurality of fasteners comprise said head and a shaft;
a portion of said plurality of fasteners are configured to slide through a portion of said second portion of said bracket and into said fixed structure;
said raised portion covers a portion of said second portion of said bracket and said head of said plurality of fasteners; and
said plurality of fasteners press said bracket into a portion of said fixed structure.

5. The bracket-flashing assembly from claim 1, wherein:
said bracket cover comprises a gap below said raised portion;
said height of said raised portion is large enough to accommodate said thickness of said bracket with additional space to accommodate a head of said plurality of fasteners;
said plurality of fasteners each comprise said head and a shaft;
a portion of said plurality of fasteners are configured to slide through a portion of said second portion of said bracket and into said fixed structure;
said raised portion covers a portion of said second portion of said bracket and said head of said plurality of fasteners; and
said plurality of fasteners press said bracket into a portion of said fixed structure.

6. The bracket-flashing assembly from claim 1, wherein:
said bracket cover comprises a plurality of fastener apertures;
said plurality of fastener apertures are configured to align with a portion of said plurality of fastener apertures in said second portion of said bracket;
a portion of said plurality of fasteners are configured to slide through a portion of said bracket cover, said second portion of said bracket and into said fixed structure;
said plurality of fasteners each comprise a head and a shaft; and
said head of said plurality of fasteners fit above said raised portion and press said bracket cover and said bracket into a portion of said fixed structure.

7. The bracket-flashing assembly from claim 6, wherein:
said bracket-flashing assembly further comprises a plurality of washers;
said plurality of fasteners attach said bracket-flashing assembly to said fixed structure by first passing through said plurality of washers prior to parts of said bracket cover and said bracket; and
said head is configured to press a portion of said plurality of washers into said bracket-flashing assembly and maintain a seal between said plurality of washers at said plurality of fastener apertures of said bracket cover.

8. The bracket-flashing assembly from claim 6, wherein:
said fixed structure comprises a plurality of shingles; and
said added fixture comprises an awning.

9. The bracket-flashing assembly from claim 6, wherein:
a portion of a plurality of shingles are cut away to accommodate said raised portion of said bracket cover.

* * * * *